United States Patent
Wang et al.

(10) Patent No.: US 9,798,634 B2
(45) Date of Patent: Oct. 24, 2017

(54) DISTRIBUTED FAILOVER FOR MULTI-TENANT SERVER FARMS BASED ON LOAD TIMES OF REPLICATED TENANTS

(71) Applicants: Mengjiao Wang, Shanghai (CN); Yu Cheng, Shanghai (CN); Wen-Syan Li, Fremont, CA (US)

(72) Inventors: Mengjiao Wang, Shanghai (CN); Yu Cheng, Shanghai (CN); Wen-Syan Li, Fremont, CA (US)

(73) Assignee: SAP SE, Walldorf (DE)

( * ) Notice: Subject to any disclaimer, the term of this patent is extended or adjusted under 35 U.S.C. 154(b) by 54 days.

(21) Appl. No.: 14/528,482

(22) Filed: Oct. 30, 2014

(65) Prior Publication Data

US 2016/0124818 A1  May 5, 2016

(51) Int. Cl.
*G06F 11/14* (2006.01)
*G06F 11/20* (2006.01)
(Continued)

(52) U.S. Cl.
CPC .............. *G06F 11/203* (2013.01); *G06F 9/50* (2013.01); *G06F 11/1451* (2013.01);
(Continued)

(58) Field of Classification Search
CPC .............. G06F 9/45558; G06F 9/45562; G06F 9/4557; G06F 9/45575; G06F 11/1484;
(Continued)

(56) References Cited

U.S. PATENT DOCUMENTS

2009/0113109 A1* 4/2009 Nelson .................. G06F 11/203
                                                          711/6
2011/0225277 A1* 9/2011 Freimuth ............ G06F 9/45558
                                                          709/223
(Continued)

OTHER PUBLICATIONS

"Advanced Failover Architecture", retrieved from http://support.rightscale.com/09-Clouds/AWS/02-Amazon_EC2/Designing_Failover_Architectures_on_EC2/03-Advanced_Failover_Architecture, May 4, 2012, 5 pages.
(Continued)

*Primary Examiner* — Joseph Schell
(74) *Attorney, Agent, or Firm* — Brake Hughes Bellermann LLP

(57) ABSTRACT

A failover manager may be configured to determine a plurality of tenants executable on a server of a plurality of servers, each tenant being a virtual machine executable on the server in communication with at least one corresponding user. The failover manager may include a replicated tenant placement selector configured to dispatch a first replicated tenant for a first tenant of the plurality of tenants to a first standby server of the plurality of servers, and configured to dispatch a second replicated tenant for a second tenant of the plurality of tenants to a second standby server of the plurality of servers. The failover manager also may include a replicated tenant loader configured to activate, based on a failure of the server, the first replicated tenant on the first standby server to replace the first tenant, and the second replicated tenant on the second standby server to replace the second tenant.

18 Claims, 10 Drawing Sheets

(51) Int. Cl.
*H04L 29/08* (2006.01)
*G06F 9/50* (2006.01)
*H04L 29/14* (2006.01)
*G06F 9/455* (2006.01)

(52) U.S. Cl.
CPC ...... *H04L 67/1008* (2013.01); *H04L 67/1095* (2013.01); *H04L 69/40* (2013.01); *G06F 11/1484* (2013.01); *G06F 2009/4557* (2013.01); *G06F 2009/45562* (2013.01); *G06F 2009/45575* (2013.01); *G06F 2201/805* (2013.01); *G06F 2201/84* (2013.01)

(58) Field of Classification Search
CPC ... G06F 2009/45562; G06F 2009/4557; G06F 2009/45575
See application file for complete search history.

(56) References Cited

U.S. PATENT DOCUMENTS

| | | | |
|---|---|---|---|
| 2013/0204917 A1* | 8/2013 | Wang | G06F 9/52 709/201 |
| 2013/0204991 A1* | 8/2013 | Skjolsvold | G06F 9/5083 709/223 |
| 2013/0204995 A1* | 8/2013 | Fu | H04L 67/1034 709/223 |
| 2013/0346360 A1* | 12/2013 | Liu | G06F 17/30289 707/609 |

OTHER PUBLICATIONS

"Basic Failover Architecture", retrieved from http://support.rightscale.com/09-Clouds/AWS/02-Amazon_EC2/Designing_Failover_Architectures_on_EC2/01-How_to_set_up_a_Basic_Failover_Architecture, May 2, 2012, 3 pages.

"Big O notation", From Wikipedia, the free encyclopedia, retrieved from http://en.wikipedia.org/wiki/Big_O_notation, Mar. 23, 2012, 11 pages.

"Failover Clusters", retrieved from http://technet.microsoft.com/en-us/library/cc732488(v=WS.10).aspx, Nov. 12, 2009, 2 pages.

"Minmax heap", From Wikipedia, the free encyclopedia, http://en.wikipedia.org/wiki/Min-max_heap, Nov. 12, 2012, 3 pages.

* cited by examiner

DISTRIBUTED FAILOVER FOR MULTI-TENANT SERVER FARMS BASED ON LOAD TIMES OF REPLICATED TENANTS

TECHNICAL FIELD

This description relates to multi-tenant server farms.

BACKGROUND

Network technology and computers with increased processing speeds and large memories, along with virtual computing software and associated hardware, enable the remote provisioning of computing resources. Providers of such computing resources invest in large quantities thereof, and enter contracts with consumers to provide specified computing resources in a specified manner. In this way, providers bear capital costs associated with maintaining associated infrastructure, and consumers, also referred to as tenants, are largely freed from such capital costs (including potentially unpredictable maintenance costs), while still benefiting from flexibility in terms of a type, quantity, and quality of computing resources consumed over time.

For example, such a resource provider may provide a consumer or other user with a certain quantity of processing power and/or a certain amount of memory per month, which may vary from month to month, and which may be subject to certain service level commitments. Examples of such service level commitments include commitments to minimum levels of availability. That is, consumers typically expect high levels of availability of provided computing resources, and failure of a provider to meet expected or required availability levels may result in lost profits and a loss of reputation in the marketplace.

To avoid such failures, providers often couple a resource, such as a virtual server provided remotely to a specific consumer, to a replica of the resource. Then, upon failure of the resource, e.g., the server, software is used to allow the replica to provide functionality and data previously provided by the resource. Related techniques are known as failover techniques, and may be largely effective in ensuring that an associated consumer does not ultimately experience loss of data or loss of desired functionalities.

However, during a time that such failover techniques are executed, e.g., between failure of a server and availability of an associated server replica, a time during which data and functionalities are unavailable may be unacceptably high. Consequently, as referenced above, consumers may be dissatisfied, and may request refunds or other compensation, or may select a new provider.

SUMMARY

The present description relates to situations in which a hardware server maintained and provided by a computing resource provider is utilized to provide remote, virtual computing resources to a plurality of tenants. Thus, such a server may be referred to as a multi-tenant server. Then, each tenant's data on the multi-tenant server is replicated to a different standby server for the tenant/data in question. In this way, for example, a distributed failover technique may be employed to reduce durations of times in which a particular tenant experiences unavailability of its server. More particularly, techniques for optimal placements of such tenants (e.g., of computing resources thereof) within and among available standby servers are described. For example, such placement techniques may consider total downtimes experienced by a group of tenants as a whole, total loading time for all tenant data loaded onto standby servers, or other metrics for evaluating an efficacy of the placement techniques.

According to one general aspect, a system may include at least one processor, and instructions recorded on a non-transitory computer-readable medium, and executable by the at least one processor. The system may include a failover manager configured to cause the at least one processor to determine a plurality of tenants executable on a server of a plurality of servers, each tenant being a virtual machine executable on the server in communication with at least one corresponding user. The failover manager may include a replicated tenant placement selector configured to dispatch a first replicated tenant for a first tenant of the plurality of tenants to a first standby server of the plurality of servers, and configured to dispatch a second replicated tenant for a second tenant of the plurality of tenants to a second standby server of the plurality of servers, and a replicated tenant loader configured to activate, based on a failure of the server, the first replicated tenant on the first standby server to replace the first tenant, and the second replicated tenant on the second standby server to replace the second tenant.

According to another general aspect, a computer-implemented method for executing instructions stored on a non-transitory computer readable storage medium includes determining a plurality of tenants executable on a server of a plurality of servers, each tenant being a virtual machine executable on the server in communication with at least one corresponding user, and dispatching a first replicated tenant for a first tenant of the plurality of tenants to a first standby server of the plurality of servers. The method may further include dispatching a second replicated tenant for a second tenant of the plurality of tenants to a second standby server of the plurality of servers, and activating, based on a failure of the server, the first replicated tenant on the first standby server to replace the first tenant, and the second replicated tenant on the second standby server to replace the second tenant.

According to another general aspect, a computer program product tangibly embodied on a non-transitory computer-readable storage medium may include instructions that, when executed, are configured to cause at least one processor to determine a plurality of tenants executable on a server of a plurality of servers, each tenant being a virtual machine executable on the server in communication with at least one corresponding user, and dispatch a first replicated tenant for a first tenant of the plurality of tenants to a first standby server of the plurality of servers. The instructions, when executed, may be further configured to dispatch a second replicated tenant for a second tenant of the plurality of tenants to a second standby server of the plurality of servers, and activate, based on a failure of the server, the first replicated tenant on the first standby server to replace the first tenant, and the second replicated tenant on the second standby server to replace the second tenant.

The details of one or more implementations are set forth in the accompanying drawings and the description below. Other features will be apparent from the description and drawings, and from the claims.

DETAILED DESCRIPTION

Figure 1:
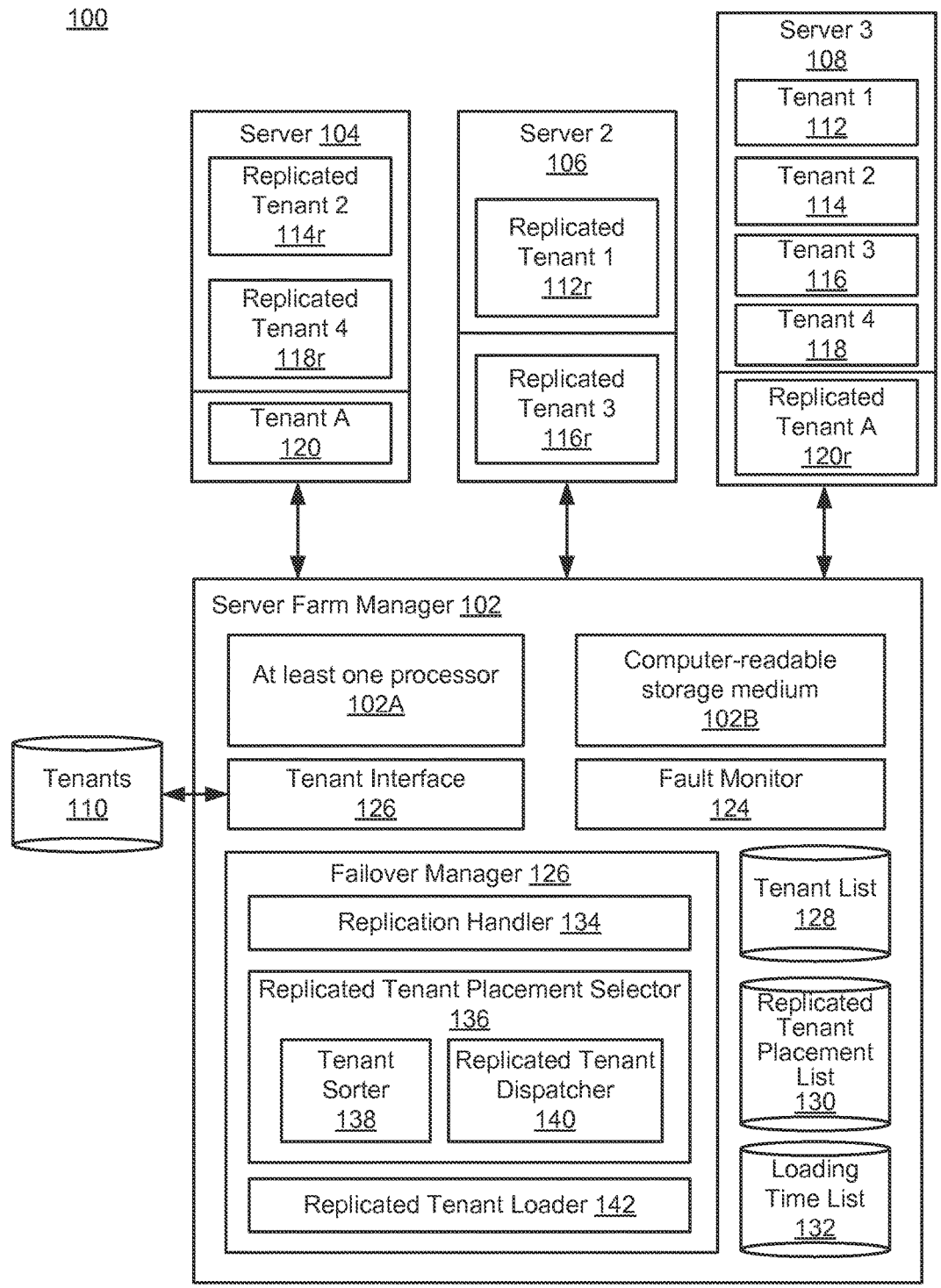
FIG. 1 is a block diagram of a system for distributed failover for multi-tenant server farms.

FIG. 1 is a block diagram of a system 100 for distributed failover for multi-tenant server farm. In the example of FIG. 1, a server farm manager 102 represents hardware (e.g., a server) and associated software for deploying, configuring, administering, maintaining, and otherwise managing a plurality of servers, represented in FIG. 1 by servers 104, 106, and 108. More particularly, the server farm manager 102 may provide such management of the servers 104-108 on behalf of a plurality of tenants 110, by providing server resources as a commodity to the tenants 110, through the use of machine virtualization.

In the example of FIG. 1, and as referenced above, the server farm manager 102 is configured to provide such server resources in a reliable manner, while minimizing any downtime or other disruption that might otherwise be experienced by one or more of the tenants 110 in conjunction with a failure or other malfunction of one of the servers 104-108. Specifically, as described in detail below, replication techniques for providing backup or standby server resources to be used in conjunction with potential server failures or other malfunctions may be executed in a manner which distributes responsibilities for providing such backup/standby server resources within and among the various servers 104-108. Consequently, service outages experienced by any of the tenants 110 will be brief, resulting in a high satisfaction level of the tenants 110. Moreover, an owner of the system 100 will be provided with efficient and cost-effective use of the various server resources therein, and will experience the benefits of increased profit and increased reputation within the marketplace.

In the example of FIG. 1, the tenants 110 are intended to refer to entities including customers, consumers, or other users of the system 100. That is, it may be appreciated that the server farm manager 102 is configured to communicate with hardware/software implemented by businesses, individuals, or other entities who contract to leverage or otherwise utilize resources of the servers 104-108, in the manner referenced above.

For example, in the simplified example of FIG. 1, tenants 112, 114, 116, and 118 represent virtual machines deployed on the server 108 on behalf of four corresponding tenants (entities) of the tenants 110. In other words, in common usage, the term tenant may refer to an entity contracting to utilize resources of the servers 104, 106, 108, and may also refer to specific virtual machines deployed thereon, on behalf of a corresponding, contracting entity (tenant). Thus, and again by way of terminology, it will be appreciated that the tenants 110 also may be referred to as customers, consumers, or other users, while the illustrated tenants 112-118 deployed on the server 108 (and any other tenant deployed on any of the servers 104-108) may be referred to, for example, as virtual servers, virtual databases, virtual machines, or any other type of virtualized computing resource.

As referenced above, the creation, deployment, and use of such virtualized computing technology, by itself, is known, and is not described herein in detail, except as may be necessary or helpful in understanding operations of the system 100 of FIG. 1. In general, however, it will be appreciated that tenants deployed as virtual machines on the various servers 104-108, e.g., the tenant 112, represent software constructs which share various hardware and software resources of an underlying server, e.g., the server 108. Consequently, it will be appreciated that the various tenants 112-118, or other tenants deployed on other ones of the servers 104-108, such as a tenant 120, described below, may represent any or all such virtual computing devices, including such virtual computing devices executing different operating systems, executing different types of applications or other functionalities, or various other features and functions of all such virtual computing platforms.

The various tenants 112-118 should thus be understood to share in the usage of the various resources of the server 108. Such resources may include, for example, processing resources, memory resources (e.g., volatile/main memory resources, as well as various types of longer term, non-volatile memory resources, such as various types of cache or other disk-based storage), as well as any necessary or useful communication interfaces, or other standard hardware resources.

In the example of FIG. 1, as described in detail below, a multi-tenant server such as the server 108 (i.e., such a server deploying multiple tenant virtual machines on behalf of corresponding multiple tenant entities) may be backed up in a distributed manner, e.g., in a manner that leverages or otherwise utilizes available server resources of some or all remaining servers within the system 100 being managed by the server farm manager 102. In particular, as shown in the simplified example of FIG. 1, the tenant 112 may be backed up and prepared for future potential failover operations, using a replicated tenant 112r deployed at the server 106. Similarly, as shown, the tenant 114 may be backed up using a replicated tenant 114r deployed at the server 104. Further, the tenant 116 may be backed up using a replicated tenant 116r at the server 106, while the tenant 118 is backed up using a replicated tenant 118r deployed at the server 104. Thus, by distributing replicated tenants 112r-118r corresponding to respective tenants 112-118 of the server 108, failover techniques employed in the event of a failure or other malfunction of the server 108 may be carried out in a distributed, parallel manner, so that corresponding ones of the entities represented by the tenants 110 may experience a minimum of downtime of their corresponding virtual machines represented by the tenants 112-118 and notwithstanding an occurrence of failure of the multi-tenant server 108. Of course, as also shown, the multi-tenant server 108 used to implement the virtual machines represented by the tenants 112-118 may itself be used to provide a backup or standby virtual machine for other ones of the servers 104, 106. Specifically, for example, as shown, the server 108 may be used to store a replicated tenant 120r corresponding to the tenant 120 of the server 104.

In the example of FIG. 1, as also described in detail below, each of the replicated tenants 112r-120r should be understood to represent, e.g., a disk image, snapshot, and/or other representation of data, functionality, and/or state of a corresponding tenant virtual machine. In this way, each such replicated tenant 112r-120r provides a backup or standby version of its corresponding tenant virtual machine 112-120.

In practice, each such replicated tenant may be stored, when not in use, using a long-term, non-volatile memory of an underlying server. Then, in the event of a failure or other malfunction of a corresponding tenant virtual machine, a given replicated tenant may be loaded into main memory and otherwise configured and parameterized to begin execution in place of its corresponding tenant, although on a different server.

For purposes of the example of FIG. 1, it should be appreciated that the server farm manager 102 may be configured to implement various management functionalities with respect to the servers 104-108, and the tenants 112-120. For example, such virtualization management techniques may involve the use of a hypervisor or other platform management tool that enables the creation/instantiation, maintenance, modification, or destruction of any tenant virtual machine deployed in the system 100 using the servers 104-108.

In the example of FIG. 1, the server farm manager 102 is illustrated as including a tenant interface 122 that is operable to communicate with the various entities represented by the tenants 110. For example, the tenant interface 122 may facilitate a creation of a new tenant virtual machine for a new or existing tenant entity, or may allow and enable an existing tenant entity to configure, access, or otherwise utilize its corresponding tenant virtual machine.

Further in FIG. 1, the server farm manager 102 is illustrated as including a fault monitor 124. The fault monitor 124 may be configured to detect failure, malfunction, or other fault experienced by a particular server by the servers 104-108. The fault monitor 124 may additionally detect various metrics characterizing operations of the various servers 104-108, in indicating a potential future failure or other malfunction.

A failover manager 126 may respond to a potential or actual failure or other malfunction of a specific multi-tenant server, such as the server 108, to thereby identify and utilize corresponding replicated tenants that are distributed within and among various remaining ones of the servers of the system 100 (e.g., the servers 104, 106). Consequently, any downtime experienced by entities of the tenants 110 deploying corresponding ones of the tenants 112-118 will be minimized.

In providing such failover management, the failover manager 126 has access to a tenant list 128, which, as explained in detail below, generally includes a listing of each of the various tenant virtual machines 112-120, in conjunction with identifications of corresponding, underlying ones of the servers 104-108, and associated loading times for each (replicated) tenant. Somewhat similarly, a replicated tenant placement list or repository 130 includes a listing of all of the replicated tenants 112r-120r, in conjunction with corresponding ones of the servers 104-108. Further, a loading time list 132 represents a repository or other data store characterizing a loading time required by each standby server for all replicated tenants stored thereon in the event of a server failure of a corresponding server before such replicated tenants will be available to corresponding entities of the tenants 110 (e.g., a loading time for loading replicated tenants 112r, 116r on the (standby) server 106 and for the replicated tenants 114r, 118r on the (standby) server 104 in the event of failure of the server 108).

In practice, the failover manager 126 may include a replication handler 134 that is configured to create and manage a replicated tenant for each tenant of a multi-tenant server within the system 100. As mentioned above, such replication handling may include a capture of an image or snapshot of associated data, operating system, or other features and functionalities of a particular tenant to be replicated. Then, the replication handler 134 may be further configured to proceed with loading the thus-replicated tenant within available storage of an appropriate server of the remaining servers 104, 106.

Specifically, the replication handler 134 may follow instructions of a replicated tenant placement selector 136. That is, the replicated tenant placement selector 136 is configured to utilize the tenant list 128 to dispatch the various replicated tenants provided by the replication handler 134 within and among the standby servers for the multi-tenant server for which failover management is being provided.

As described in detail below, e.g., with respect to FIGS. 3A-5C, the replicated tenant placement selector 136 may be configured to generate the replicated tenant placement list 130 in a manner which minimizes a downtime experienced by any entity of the tenants 110 corresponding with the various tenants 112-118 of the multi-tenant server 108 that is presumed for the example to have failed. Moreover, the replicated tenant placement selector 136 may be configured to generate the replicated tenant placement list 130, even when a number of virtual machines deployed as tenants among the various available servers of the system 100 is very large, when a number of such tenants are appreciatively larger than a number of available standby servers, and/or when a large number of servers are in use.

In other words, in such scenarios, the replicated tenant placement selector 136 may be configured to explore a potentially large solution space for potential placements of the various replicated tenants. In particular, as shown, the replicated tenant placement selector 136 may include a tenant sorter 138 that is configured to sort a loading time of each (replicated) tenant, from greatest loading time to least loading time. Then, a replicated tenant dispatcher 140 may proceed to assign and dispatch individual replicated tenants among available servers, in a manner which helps ensure that failover occurs quickly. In various examples provided below, the replicated tenant placement selector 136 utilizes the tenant sorter 138 and the replicated tenant dispatcher 140 to implement a minimum heap-based, greedy algorithm, to thereby ensure that a downtime experienced by any one of the tenants 112-118 of the multi-tenant server farm 108 is minimal, and, in any case, is not significantly greater than any other one of the tenants 112-118 affected by a fail of the server 108.

Once the anticipated failure of the server 108 occurs, a replicated tenant loader 142 may be responsible for utilizing the replicated tenant placement list 130 to load appropriate ones of the replicated tenants corresponding to tenants of the multi-tenant server that have failed. In particular, the tenant loader 142 may utilize the replicated tenant placement list 130 provided by the replicated tenant placement selector 136 to load and otherwise activate only the replicated tenants corresponding to tenants of a failed multi-tenant server, such as the tenants 112-118 of the server 108. For example, if the server 104 failed, then the replicated tenant loader 142 would proceed to load only the replicated tenant 120r for execution thereof using the server 108, while not loading any other replicated tenant (not shown) that may be stored using the server 108 but that does not correspond to a separate tenant of the failed server 104.

In the example of FIG. 1, the server farm manager 102 may be understood to represent a server or other appropriate computing device that includes at least one processor 102A and non-transitory compute readable storage medium 102B. Thus, in practice, the failover manager 126 and other components of the server farm manager 102 may be implemented using corresponding instructions stored within the non-transitory computer readable storage medium 102B and executed by the at least one processor 102A. Further, of course, the non-transitory computer readable storage medium 102B may represent one or more memories used to store data required by the server farm manager 102, e.g., the various lists/repositories 128-132.

Of course, the at least one processor 102A may represent two or more processors, perhaps executing in parallel, while, similarly, and as just referenced, the non-transitory computer readable storage medium 102B may represent virtually any type of appropriate computer memory, or various combinations thereof. Of course, although not explicitly illustrated, the servers 104-108 may similarly include appropriate processing, memory, and other compute resources.

Similarly, the server farm manager 102 may be implemented using two or more servers, where, in some implementations, such servers may be partially or completely implemented using one or more of the available servers 104-108. More generally, it will be appreciated that any single block or module of the server farm manager 102 may be implemented as two or more sub-modules. Similarly, but conversely, any two or more combinations of components may be executed or implemented as a single, combined component.

Figure 2:
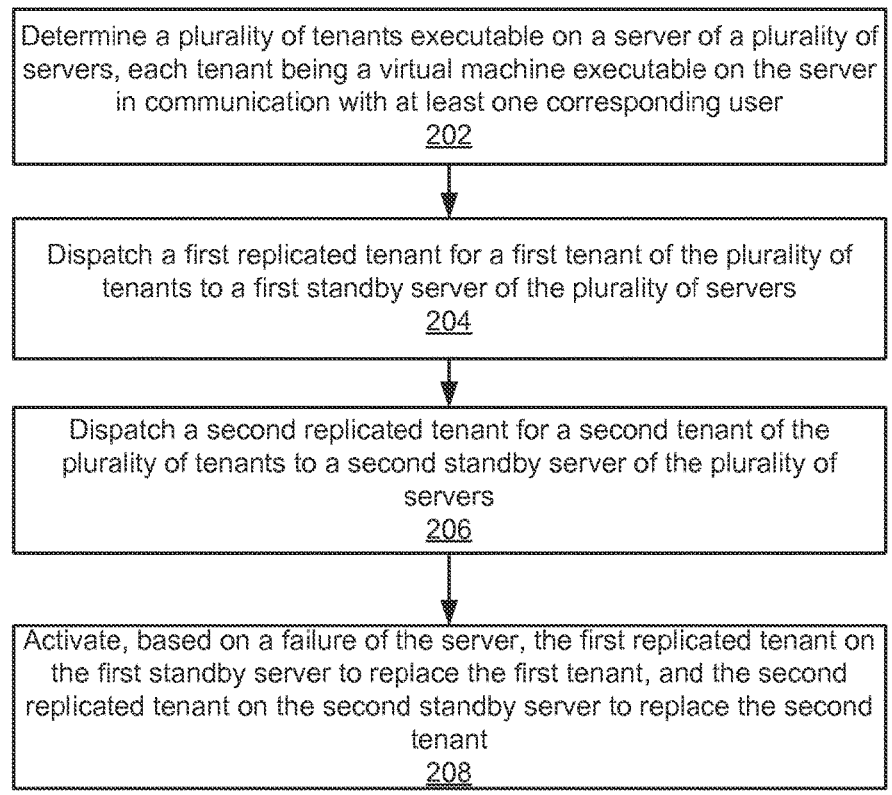
FIG. 2 is a flowchart illustrating example operations of the system of FIG. 1.

FIG. 2 is a flowchart 200 illustrating example operations of a system 100 of FIG. 1. In the example of FIG. 2, operations 202-208 are illustrated as separate, sequential operations. However, in various implementations, additional or alternative operations may be included, and/or one or more operations may be omitted. In the various implementations, two or more operations or sub-operations may be executed in a partially or completely overlapping or parallel manner, or in a nested, iterative, looped, or branched fashion.

In the example of FIG. 2, a plurality of tenants executable on a server on a plurality of servers is determined, each tenant being a virtual machine executable on the server in communication with at least one corresponding user (202). For example, the plurality of tenants may include the tenants 112-118 executing on the server 108 of FIG. 1. For example, the failover manager 126 of FIG. 1 may be configured to determine the tenants 112-118 of the server 108.

As referenced above, the various tenants may represent virtually any type of virtual machine that may require, or benefit from, the type of distributed failover techniques described herein. For example, a tenant may represent a virtual machine providing a virtual server, executing an operating system (e.g., Linux, Unix, or Windows operating system), on which in an associated application may execute. In other examples, a tenant might represent a virtual machine providing a database, such as an Oracle database, a MySQL database, or other known or future database application. In practice, the plurality of servers, e.g., the servers 104-108 of FIG. 1, may themselves execute any appropriate operating system suitable for providing the types of virtual machines just referenced. Moreover, the plurality of servers may each execute different ones of these operating systems, i.e., the system 100 does not require that the plurality of servers 104-108 all with themselves execute the same operating system. Thus, for example, if the server 108 is a Windows-based server providing the tenant 112 as including an Oracle database, and the server 106 is, e.g., a Linux or a Unix-based server, the tenant 112 may nonetheless be backed up using the replicated tenant 112r, as referenced above and described in detail below.

Further in FIG. 2, a first replicated tenant for a first tenant of the plurality of tenants may be dispatched to a first standby server of the plurality of servers (204), and a second replicated tenant for a second tenant of the plurality of tenants may be dispatched to a second standby server of the plurality of servers (206). For example, the replicated tenant placement selector 136 may be configured to dispatch the replicated tenant 112r for the tenant 112 to the server 106, while dispatching the replicated tenant 114r for the tenant 114 to the server 104. As referenced above, and described in detail below, the replicated tenant selector 136 may utilize one or more techniques or algorithms for selecting a destination server for each replicated tenant. For example, the replicated tenant replacement selector 136 may utilize a greedy algorithm, or an enumeration algorithm.

Based on a failure of the server, the first replicated tenant may be activated on the first standby server to replace the first tenant, and the second replicated tenant may be activated on the second standby server to replace the second tenant (210). For example, a replicated tenant loader 142 may be configured, based on notification of failure of the server 108 by the fault monitor 124, to activate the replicated tenant 112r on the server 106 and the replicated tenant 114r on the server 104, to thereby provide corresponding replacement for the tenant 112 and the tenant 114, for corresponding users thereof.

In the simplified example of FIG. 2, specific discussion of neither the replicated tenants 116r and 118r, nor the tenant 120 and associated replicated tenant 120r, is provided. Rather, FIG. 2 is provided as a simplified example of basic operations for distributed failover and multi-tenant server farms, in which tenants' data on a given server is replicated using other servers, so that each such server provides a standby server for one or more tenants of the server in question. As a result, a reduction of a quantity of time in which each such tenant is unavailable during a failure event may be produced. Moreover, the described techniques are highly suitable for current and future configurations of cloud-based services, in which multiple tenants commonly share a single server.

Of course, in specific implementations of the operations 202-208 of the flowchart 200 of FIG. 2, as already discussed above in the example of FIG. 1, the system 100 may execute one or more specific algorithms for achieving a high degree of optimization with respect to selection and placement of the various replicated tenants being deployed. Consequently, such replicated tenant placement optimization provides associated optimizations for reduction of length of downtime experienced by users during server failure events.

Figure 3A:
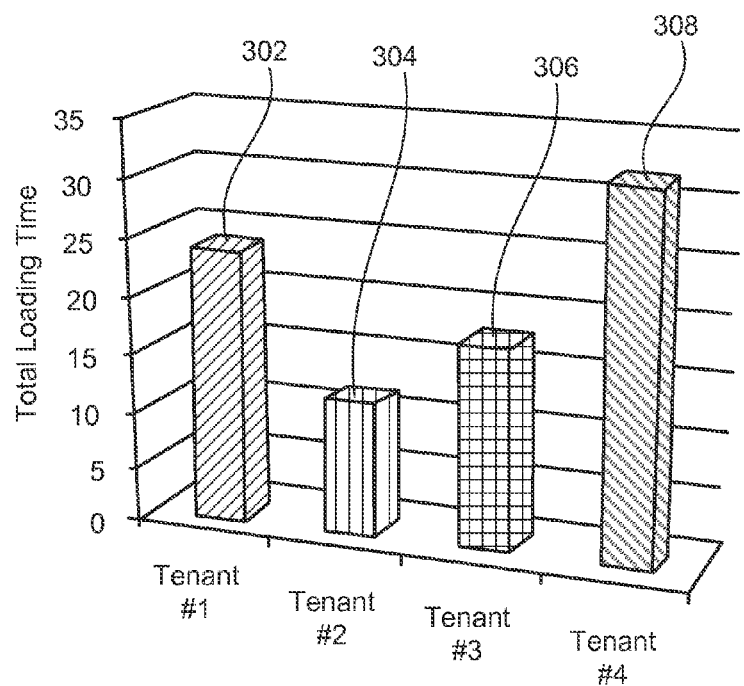
FIG. 3A is a graph illustrating unsorted tenants in the system of FIG. 1.

In order to provide simplified example details for such optimization algorithms, FIG. 3A illustrates examples of loading times required by each of the tenants 112-118 of FIG. 1. That is, as referenced above, a given tenant, and its corresponding replicated tenant, will include a certain quantity of data that is replicated. As referenced above, each replicated tenant is stored at its assigned standby server, using appropriate non-volatile (e.g., disk-based) storage, so that, upon a server failure and associated tenant failure, the corresponding replicated tenant may be loaded into main memory of the standby server, in order to provide immediate continuation of operations that were being executed by the tenant on the failed server, using the now-activated replicated tenant on the standby server. Thus, in practice, as represented by the simplified example of FIG. 3A, tenants/replicated tenants including more data will generally require correspondingly longer amounts of time to complete these types of loading operations.

Specifically, as illustrated, a loading time 302 corresponds to the tenant 112 of FIG. 1 (and its associated, replicated tenant 112r). Similarly, the tenant 114 is illustrated as being associated with a loading time 304, the tenant 116 is illustrated as being associated with a loading time 306, and the tenant 118 is illustrated as being associated with a loading time 308.

Then, in order to implement a greedy algorithm using the replicated tenant placement selector 136, to thereby optimize placement selection for the various replicated tenants 112r-116r among the standby servers 104, 106, the tenant sorter 138 may proceed to sort the loading times 302-308 in order, from greatest to least. Consequently, as shown in the simplified example of FIG. 3B, the various loading times 302-308 are sorted into an order of 308, 302, 306 and 304.

Figure 4A:
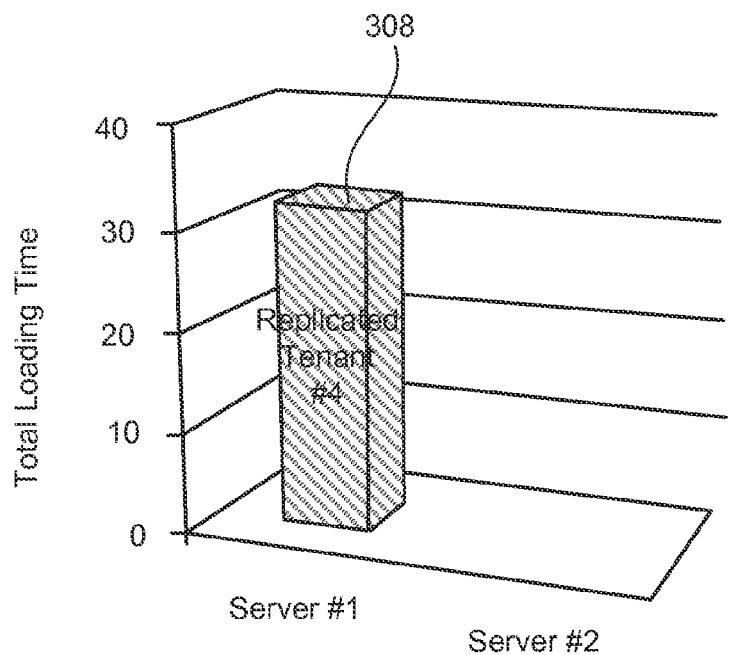
FIG. 4A is a graph illustrating a first dispatching operation for the graph of FIG. 3B.

Then, the replicated tenant dispatcher 140 may be configured to proceed with the greedy algorithm, including creating a minimum heap of loading times at each standby server. Specifically, as shown, the replicated tenant dispatcher 140 may begin by dispatching the largest loading time 308 to a first standby server of the available standby servers, as illustrated in the example of FIG. 4A. Then, the replicated tenant dispatcher 140 may proceed with dispatching a replicated tenant corresponding to the second highest loading time 302, by selecting a remaining server of the potential standby servers. Thus, in the example of FIG. 4B, and corresponding to the example of FIG. 1, the replicated tenant 112r is dispatched to the standby server 106.

Figure 3B:
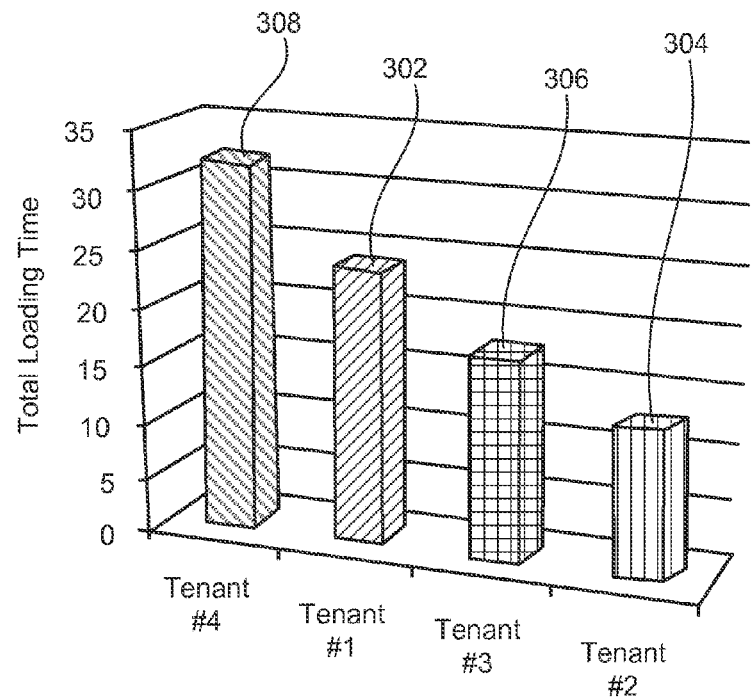
FIG. 3B is a graph illustrating a sorted ordering of the unsorted tenants of FIG. 3A.
Figure 4B:
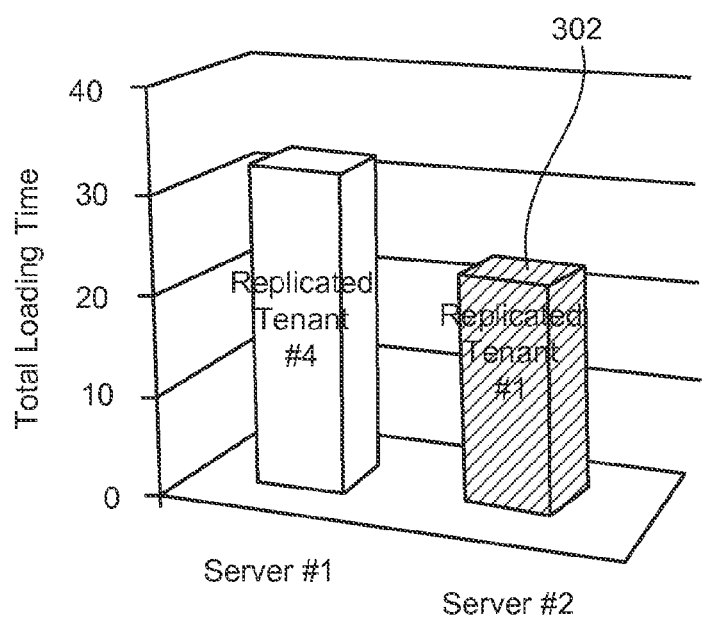
FIG. 4B is a graph illustrating a second dispatching operation for the graph of FIG. 3B.
Figure 4C:
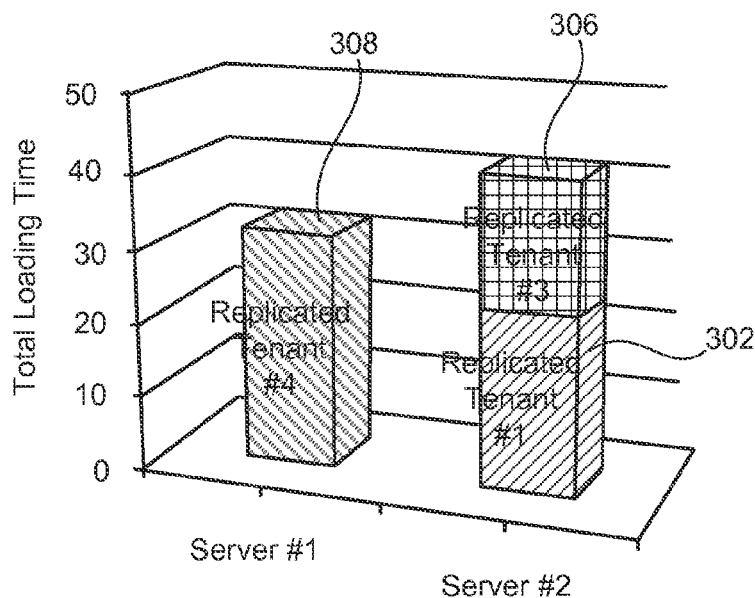
FIG. 4C is a graph illustrating a third dispatching operation for the graph of FIG. 3B.
Figure 4D:
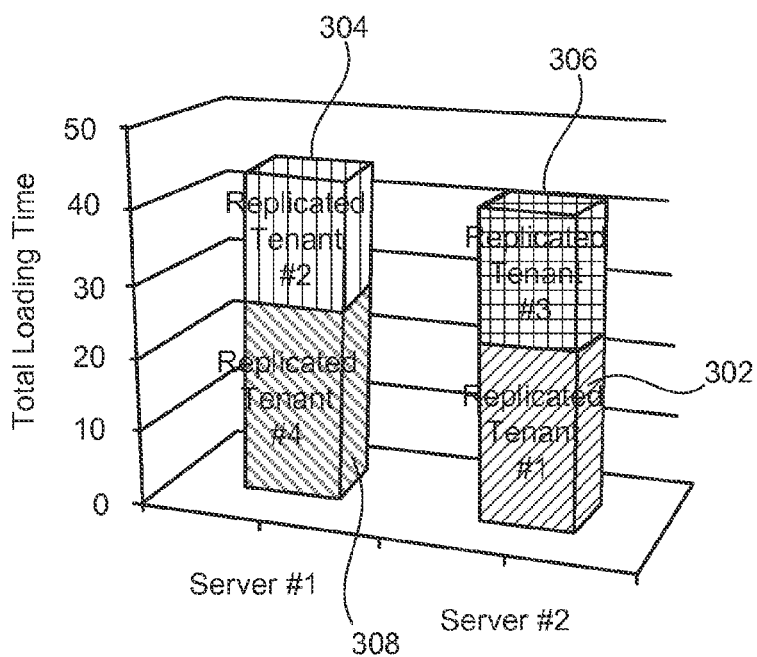
FIG. 4D is a graph illustrating a fourth dispatching operation for the graph of FIG. 3B.

In other words, as described in more detail below with respect to FIG. 6, the replicated tenant dispatcher 140 begins with the highest loading time 308 and a first standby server of available standby servers, and proceeds to assign corresponding replicated tenants among the available standby servers in a round-robin or other suitable fashion, in an order from greatest to least loading time, until all available standby servers have been assigned a replicated tenant. In the simplified example of FIG. 1 and FIGS. 3A-4D, only two standby servers 104, 106 are illustrated, so that FIGS. 4A, 4B illustrate a simplified example of the type of round-robin, descending order distribution of replicated tenants just described. Once this initial distribution is completed, the replicated tenant dispatcher 140 may select the next-available loading time and associated replicated tenant. In the present example, as just described, the number of standby servers is two, so that the third-greatest loading time 306 of FIG. 3B is selected, and its corresponding, replicated tenant 116r is dispatched to the standby server having the smallest current loading time requirement for its assigned replicated tenant. In the example of FIG. 4C, as observed from the example of FIG. 4B, the replicated tenant 112r has a loading time that is less than that of the replicated tenant 118r. Consequently, the replicated tenant 116r is dispatched to the server 106.

These operations of the replicated tenant dispatcher 140 may then be repeated. That is, the replicated tenant dispatcher 140 will again select a standby server having the least required loading time for the one or more replicated tenants stored thereon, and thereafter assigned a next-highest loading time and associated replicated tenant thereto. Specifically, in the example of FIG. 4D, it may be appreciated from the example of FIG. 4C that the loading time 308 for the single replicated tenant 118r is less than the combined loading times 302, 306 for the corresponding replicated tenants 112r, 116. Consequently, the replicated tenant dispatcher 140 proceeds to assign the next-highest loading time 304 (which happens to be the last and least loading time in the example of FIG. 3B) to the standby server 104. In the simplified example of FIGS. 4A-4D, as just referenced, the replicated tenant 114r and its corresponding loading time 304 fulfill the final placement selection and associated dispatching of the example scenario, thereby completing the example.

Of course, in practice, a number of servers and tenants will be much higher than in the simplified example of FIGS. 3A-4D. For example, in FIG. 5A, a plurality of servers 502 is illustrated. As shown, the various servers 502 may each be associated with one or more corresponding users 504, and a plurality of tenant virtual machines corresponding to specific ones of the tenant users 504 may be deployed on each of the various servers 502.

Specifically, as shown, a number of tenants 506 may be deployed on the first server of the servers 502, while a plurality of tenants 508 may be deployed on the second server of the serves 502. Further, a list of tenants 510 may be executed at a specific server 512 of the servers 502, where it is assumed that the server 512 is a problematic server that experiences, e.g., a server failure or other malfunction.

Thus, in the example, it will be apparent that operations of the failover manager 126 will be required to dispatch replicated tenants for the tenants 510 of the problematic server 112 among remaining ones of the plurality of servers, operating as standby servers, just as the replicated tenants 112r-118r for the corresponding tenants 112-118 of the server 108 were dispatched among the servers 104, 106, as described above. That is, such various replicated tenants may be distributed prior to the actual failure of the problematic server 512, to thereby be ready for loading thereof in the event of the failure of the problematic server 512.

Figure 5A:
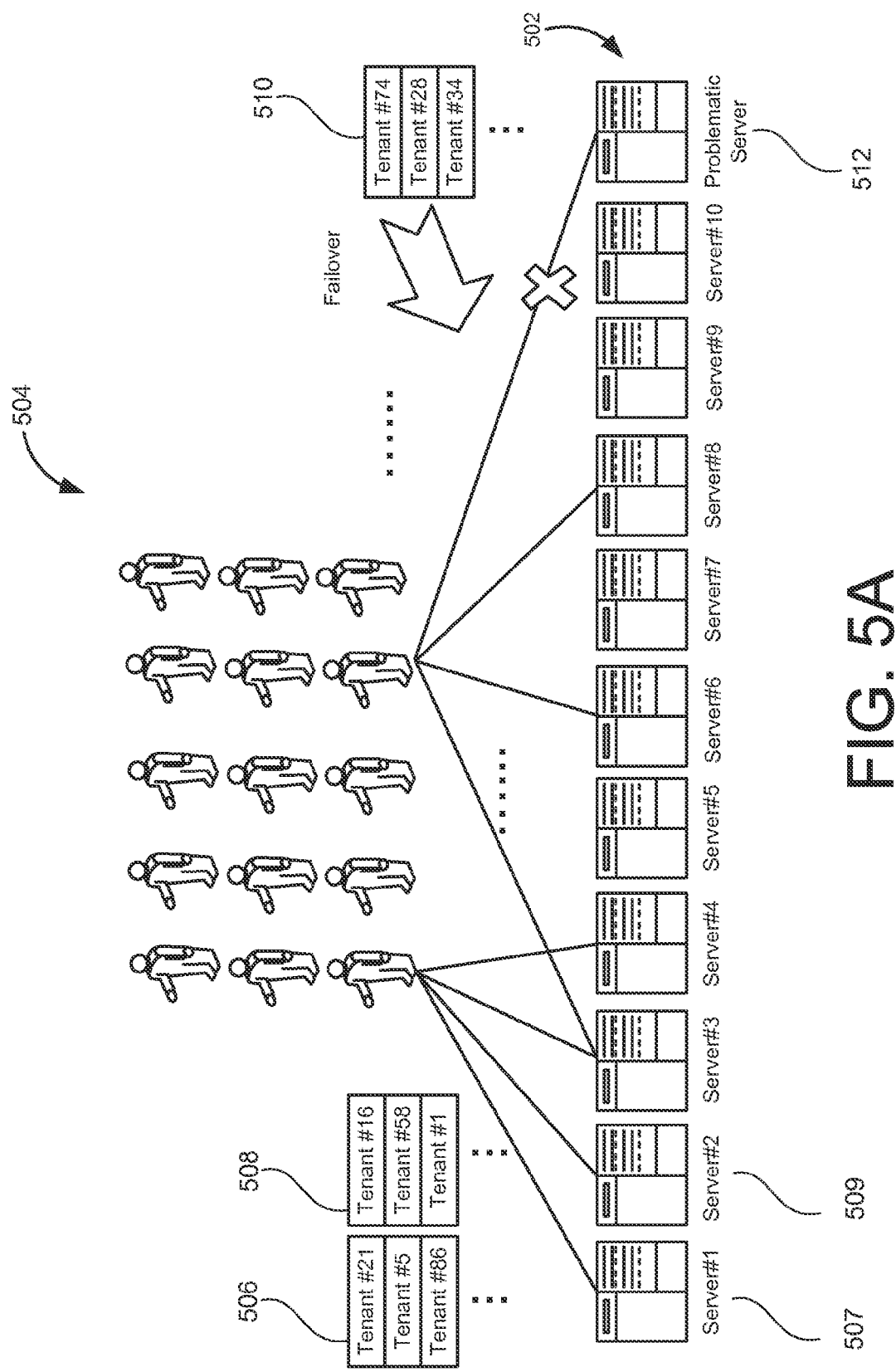
FIG. 5A is a block diagram illustrating an example failover operation of the system of FIG. 1.
Figure 5B:
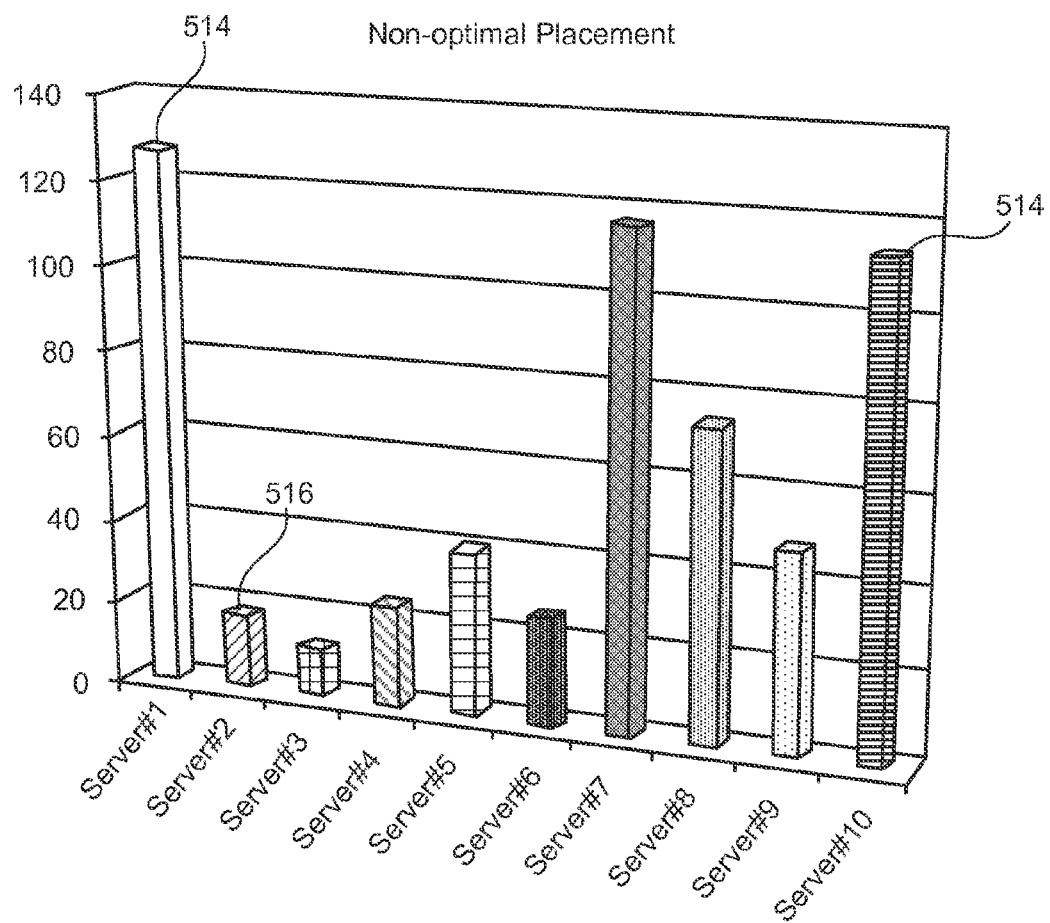
FIG. 5B is a graph illustrating a first tenant placement scenario for the example of FIG. 5A.

FIG. 5B illustrates a non-optimized placement of replicated tenants for the tenants 510. That is, it will be appreciated that the various loading times of the FIG. 5B correspond to associated replicated tenants at the various standby servers of the servers 502. In the event of the failure of the problematic server 512, FIG. 5B illustrates that the various corresponding replicated tenants, having been distributed among remaining ones of the servers 502, will generally be available for loading an use thereof. However, as shown, without the optimized placement selection process described above with respect to FIGS. 3A-4D, significant differences in loading times at specific servers may be experienced. For example, as shown in FIG. 5B, a total loading time 514 for the server 507 may be considerably greater than a loading time 516 for any and all replicated tenants stored using the standby server 509.

Figure 5C:
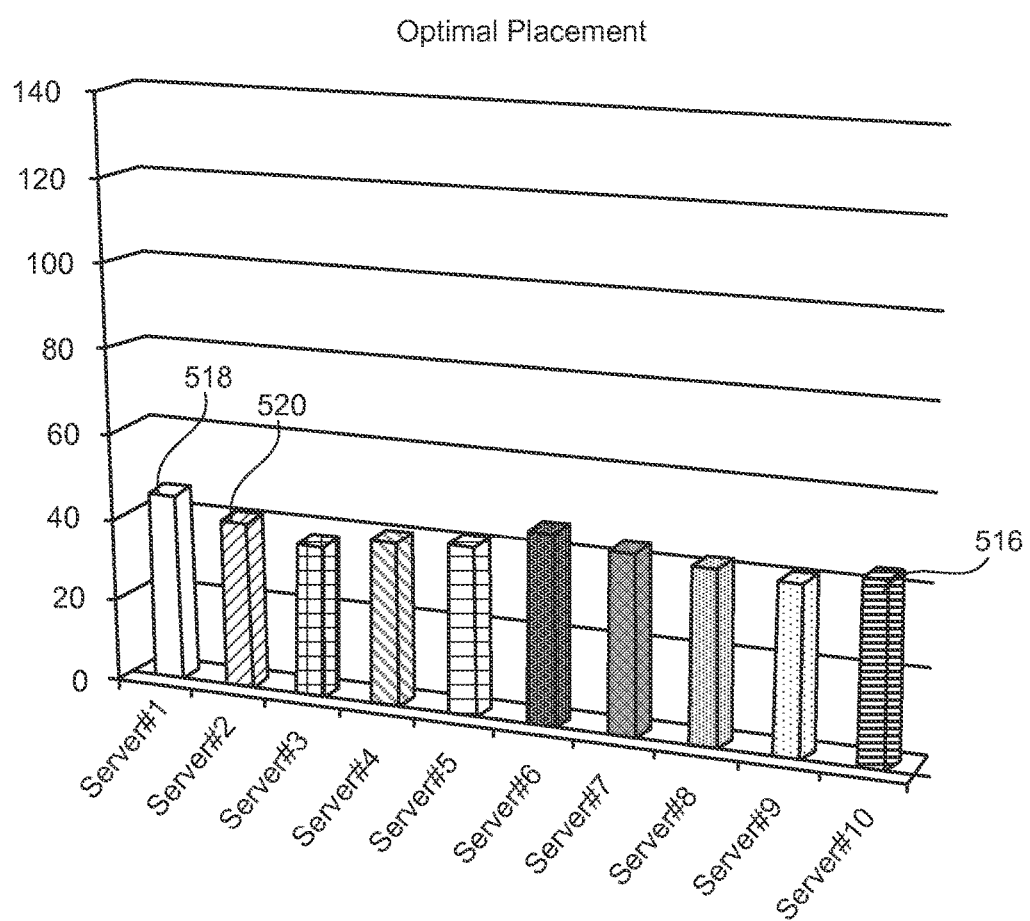
FIG. 5C is a graph illustrating a second tenant placement scenario for the example of FIG. 5A, in accordance with the examples of FIGS. 3A-4D.

As a result, specific users of the tenant users 504 may experience differences in downtime in the event of the failure of the problematic server 512. In order to minimize or avoid such differences, FIG. 5C illustrates an optimized placement scenario, in which the replicated tenant dispatcher 140 executes the greedy algorithm and associated minimum heap approach illustrated and described above with respect to FIGS. 3A-4D, and described in more detail below, with respect to FIG. 6. As shown in the example of FIG. 5C, the various loading times for all of the standby servers of the servers 502 are very similar, and are minimized to a great extent. For example, by way of contrast with the example of FIG. 5B, loading times 518 and 520 for the servers 507, 509, respectively, are now roughly equivalent.

Figure 6:
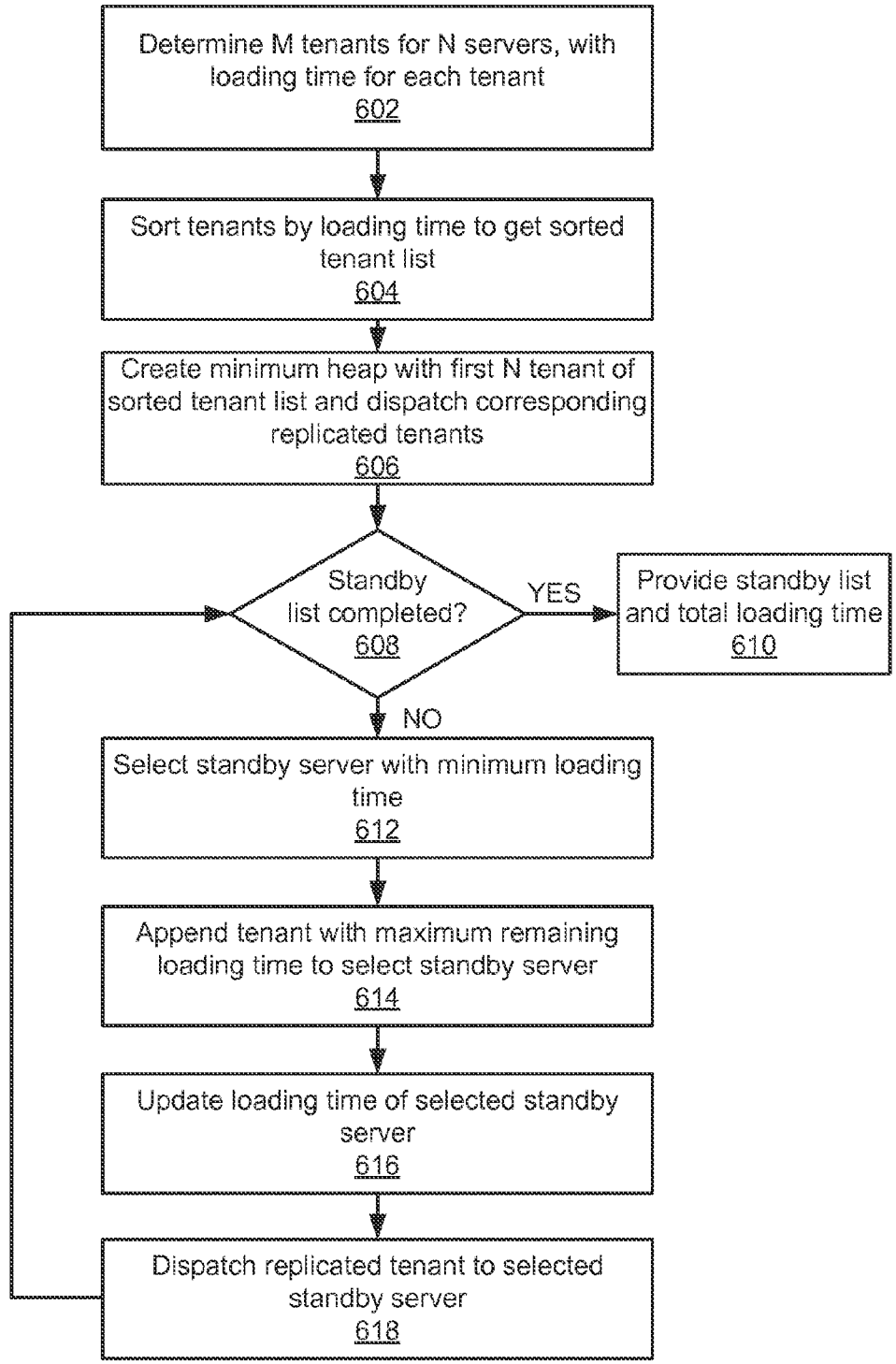
FIG. 6 is a flowchart illustrating more detailed example tenant placement operations of the system of FIG. 1, in accordance with the examples of FIGS. 3A-4D and FIG. 5C.

FIG. 6 is a flowchart 600 illustrating example detailed operations of the replicated tenant dispatcher 140 in conjunction with the examples of FIGS. 3A-4D and FIGS. 5A, 5C (but not FIG. 5B). In the example of FIG. 6, initially, it is assumed that a number of tenants are equivalent to "M" while a number of available servers are equivalent "N." Thus, for example, in the examples of FIGS. 3A-4D, the number of tenants is N=4, while the number of available standby servers is N=2. In the example of FIG. 5A, a number of tenants is not specifically provided, but should be understood to include all of the tenants 510 assigned to the server 512. Meanwhile, the number of potential standby servers N=10 includes all remaining ones of the plurality of servers 502. In practice, the number N of standby servers need not include all servers in a server farm other than the server for which tenants are being replicated. For example, in some cases, some servers of a server farm may be operating at capacity, or above a capacity threshold, and may not be available to serve as standby servers for the multi-tenant server being considered.

With reference to the above-described example scenarios, then, it will be understood that the operation of the flowchart 600 of FIG. 6 may be performed individually for each server having a plurality of tenants stored thereon, at a time prior to a potential failure or other malfunction of the server in question. In other words, as represented and conceptually in the example of FIG. 1, tenants stored on other ones of the servers 104, 106, such as the tenant 120 on the server 104, must themselves be replicated and dispatched to another one of the remaining servers, as already described with respect to the replicated tenant 120r. Thus, in the context of FIG. 5A, the operations of the flowchart 600 of FIG. 6 may be performed with respect to the M tenants of the list 506 for the server 507, using the remaining N=10 of the plurality of servers 502, and, similarly, for the M tenants of the list 508 stored using the server 509, and again using the N=10 remaining servers of the plurality of servers 502 as standby servers for the various replicated tenants of the M tenants of the list 508.

Thus, in the example of FIG. 6 and with reference specifically to the M tenants of the list 510, M tenants for N servers may be determined, along with loading time for each such tenant (602).

For example, the tenant list 128 of FIG. 1 may be utilized to determine the N tenant and N available servers. That is, as described above with respect to FIG. 1, the tenant list 128 represents, e.g., a table describing each tenant and its associated server. In a specific implementation, the tenant list 128 also may include a loading time for loading each tenant's data. Table 1, below, illustrates an example format for the tenant list 128.

TABLE 1

| Column Name | Description |
| --- | --- |
| Server ID | ID number of server. |
| Tenant ID | ID number of tenants placed on the associated server. |
| Loading time | Time cost for loading of tenant data. |

Then, the M tenants may be sorted by corresponding loading times, to thereby obtain a sorted tenant list (604). Such sorting operations are not described or illustrated specifically with respect to the example of FIG. 5A, but may be easily appreciated and understood from the simplified example of FIGS. 3A, 3B.

Then, a minimum heap of loading times may be created with the first N tenants of the sorted tenant list (606). Again, with reference to the earlier example of FIGS. 4A-4D, the subset of M tenants corresponding to a total number N of available standby servers may be initially selected. In the example, N=2, so that the first 2 of the M=4 tenants are selected, and corresponding replicated tenants are dispatched, e.g., in a round-robin fashion, among the N standby servers, in descending order loading times. Thus, in the example of FIG. 5A, the first N=10 tenants of the M tenants in the list 510 may be selected from the sorted tenant list associated therewith, and distributed in a round-robin fashion among remaining servers of the plurality of servers 502 in a descending order of loading times.

Following the just-described round-robin placement of the first N tenants of the M tenants, a determination of whether a complete standby has been completed may be made (608). In other words, if all of the M tenants have been assigned to a corresponding standby server, then the process 600 is completed and the resulting standby list and total loading time required in the event of failure of the server in question may be provided (610). In other words, for example, the tenant placement selector 136 may output the replicated tenant placement list 130 and the total loading time list 132 of FIG. 1. As described above, the replicated tenant placement list 130 includes the just-referenced standby list, e.g., as a table showing a placement of replicated tenants and corresponding standby servers. As shown in Table 2, such a table may include a tenant identifier for each replicated tenant placed on a corresponding standby server, itself represented in Table 2 by a corresponding standby server identifier.

TABLE 2

| Column Name | Description |
| --- | --- |
| Tenant ID | ID number of tenants placed on the associated server. |
| Standby Server ID | ID number of the server for the associated tenant's workload. |

Meanwhile, the loading time 132, representing a result in loading time experienced by each standby server in accordance with the replicated tenant placement of the list 130, will include a total sum of loading time of all replicated tenants on each standby server. For example, as shown in table 3, the loading time 132 may be represented using a table in which each standby server identifier is associated with a time cost for loading all replicated tenant data stored therein and associated with a corresponding, original server identifier (representing an identifier of the server on which the original tenants of the replicated tenants are provided).

TABLE 3

| Column Name | Description |
| --- | --- |
| Standby Server ID | ID number of standby server. |
| Time cost | Time cost of loading all the tenants' data in this standby server. |
| Original Server ID | ID number of original server with tenant |

In practice, a total loading time associated with a particular server failure, such as the problematic server 512 of FIG. 5A, may be expressed as a maximum loading time of a specific one of the N standby servers, on the assumption that the loading of the various replicated tenants by the various standby servers perceived in parallel.

In some examples, loading time for a particular tenant/replicated tenant may be determined based on a total contract size specified in an executed contract with a corresponding tenant entity/user. In other words, in many cases, such a user will contract to obtain a specified quantity of computing resources (e.g., processing power, or memory). In practice, at any given time, a user may not be currently consuming a maximum amount of such contracted resources. Thus, loading time for such a tenant may be based on a total contracted loading time, or, in some implementations, may be based on a current or projected use of available contracted computing resources.

In the example of FIG. 6, in a first iteration of the flowchart 600, it is unlikely that the standby list will be completed (608). As a result, as already described above with respect to FIGS. 4A-4D, a standby server with a minimum loading time may be selected (612). For example, as already described above with respect to FIG. 4C, the loading time 302 may be selected as being less than the loading time 308, and the tenant with maximum remaining loading time (e.g., the tenant 116r having a loading time 306) may be appended to the thus-selected minimum loading time at the corresponding standby server (614).

The loading time of the corresponding standby server may then be updated (616). For example, the loading time of the standby server 108 may be updated within the loading time 132, corresponding to table 3, above. Then, the replicated tenant corresponding to the appended loading time may be dispatched to the corresponding, selected standby server (618).

If this iteration completes the standby list (608), then completion of the replicated tenant placement list 130 and the loading time 132 may be provided (610). Otherwise, iterations may proceed (612-618), until all of the M tenants have been assigned among the N standby servers (610).

In dispatching the various replicated tenants, it is assumed that the replication handler 134 of FIG. 1, as already described with respect to FIG. 1, above, may be configured to execute the actual copying of tenant data, for transmission thereof to selected, corresponding standby servers. Such replication, by itself, is generally well-known, and may include, for example, replication of log files and/or replication of a disc image of each tenant being replicated.

Figure 7:
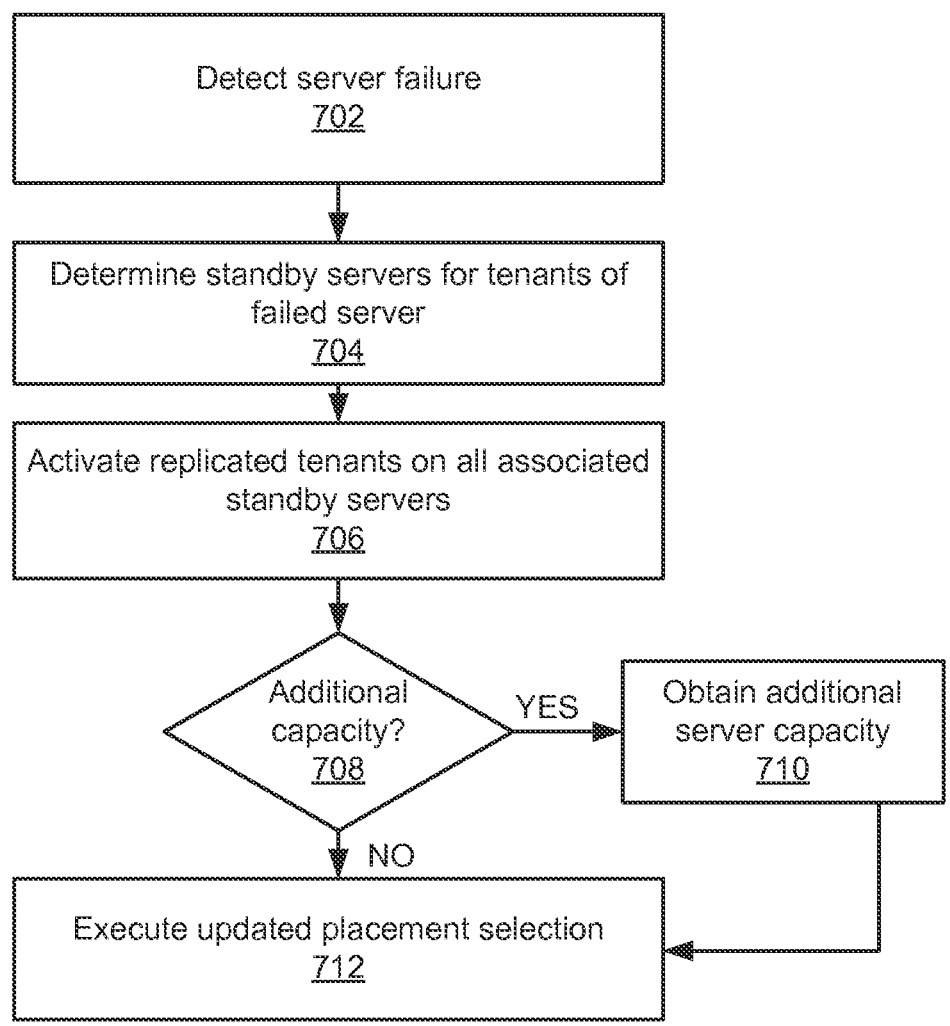
FIG. 7 is a flowchart illustrating more detailed example loading operations of the system of FIG. 1, in accordance with the example operations of FIG. 6.

FIG. 7 is a flowchart 700 illustrating example operations executed in conjunction with a detected server failure. Thus, for example, the fault monitor 124 may detect a server failure (702), such as a failure of the problematic server 512 of FIG. 5A. Then, the replicated tenant placement list 130 may be consulted to determine relevant standby servers for tenants of the failed server (704), and thereby identify all replicated tenants for the tenants of the failed server.

The replicated tenant loader 142 may proceed to activate all such replicated tenants on relevant, corresponding standby servers (706). Of course, it may occur that a given standby server acts as a standby server (e.g., stores replicated tenants for) more than one multi-tenant server. In such cases, the replicated tenant loader 142 will activate only those replicated tenants corresponding to the server that has failed.

In executing such activation of the replicated tenant, various known activation/loading techniques may be utilized. For example, a replay or redo of a corresponding log file for the replicated tenant being activated may be executed in the standby server in question. In additional or alternative examples, a full restart of the standby server may be executed, using a replicated disc image of the replicated tenant in question.

As a result of the server failure, it will be appreciated that a total quantity of server resources will be reduced. For example, in the example of FIG. 5A, the plurality of servers 502 originally includes 11 servers, but includes only 10 servers after the failure of the problematic server 512. As a result, it may be likely that a percentage of use of resources of each server will be increased, and may reach 100% or some other threshold. Of course, such a threshold may be reached more quickly in the event of a simultaneous or otherwise co-occurring failure of two or more servers.

Consequently, in the example of FIG. 7, a check for whether additional server capacity will be required may be performed (708). If so, then the additional server capacity may be obtained (710). For example, additional server hardware may be purchased (or otherwise obtained) and deployed.

Upon such deployment, or after a determination that additional server capacity is not required (708), an updated placement selection process may be executed (712). In other words, for example, the tenant placement selector 136 may execute the process of FIG. 6. In this way, replicated tenants of the tenants of the failed server, which are now serving as primary tenants for corresponding users, may themselves be replicated, in anticipation of a further potential failure of the servers on which they are stored.

Further, any replicated tenants of the failed server, such as the replicated tenant 120r of the server 108 of FIG. 1, may also be affected by the failure of the failed server. Although the resulting unavailability of such a replicated tenant would not have an immediate impact on the corresponding tenant (e.g., the tenant 120 of the server 104), the result would be that the corresponding tenant does not have a replicated tenant at that time. Thus, the updated placement may include placement of a new replicated tenant for any such tenant, on a different standby server than the failed server.

Thus, the updated placement selection process may serve to obtain in a current/updated optimization of replicated tenant placement. As such, such updated placement selection processes may be executed at other times, e.g., at regularly scheduled intervals, or upon the occurrence of some predetermined event (e.g., the addition of a new server, or a new tenant).

Thus, in the above examples, a greedy algorithm is described for replicated tenant placement in standby servers. By way of mathematical representation, it if n tenants are placed on the unavailable server, and the necessary loading times are denoted as $$t_{i,j} i = 1, 2, \ldots, n,$$

then there may be m servers $$s_p j = 1, 2, \ldots, m$$

working normally and available to be utilized as standby servers. It is expected that an optimal replacement of n tenants from the unavailable server is obtained, where $\max_j \sum_{i=1}^{m_j} t_{i,j}$ is minimized. Here $t_{i,j}$ denotes loading time of the i-th tenant on the j-th standby server; $m_i$ is the number of tenants placed on the j-th standby server. The algorithm contains two steps:

First, tenants are sorted in the server according to loading time in descending order. In this step, any existing sorting method (e.g. quick sort, merge sort, heap sort, and et al.) can be used to sort tenants.

Second, each ordered tenant may be dispatched to the standby server with the minimum sum of loading time of all tenants that have been dispatched to this standby server. The greedy algorithm gives results quickly, as it scans the ordered tenant only once, and the sum of loading time in each standby server can be stored in a minimum heap for fast retrieval of the minimum value.

The following provides a pseudocode example of this type of algorithm:

```
    % The input of this function includes:
    % Tenant_List : a list of tenants with loading time
    % M : the number of tenants
    % N : the number of standby servers (M > N)
    % The output of this function include:
    % Replicated Tenant_List: which is the placement of tenants
       in standby servers
       % total_loading_time: which is the total loading time of the
       current placement method
1.  Function Tenant_Placement(Tenant_List, M, N)
       % sort the list according to loading time
2.  Sorted_Tenant_List <- sort(Tenant_List)
       % create a minimum heap with the first N elements in the
       sorted tenant list
3.  min_heap <- create_min_heap(Sorted_Tenant_List[1 . . . N])
       % create a list representing the tenants in each standby server
4.  Replicated Tenant _List <- create_list_of_list(N)
5.  FOR i <- 1 + N to M
       % get the standby server to dispatch
6.     min <- get_min_element(min_heap)
       % append the current tenant to the corresponding standby
       server
7.     Replicated Tenant_List[min.id].append(Sorted_Tenant[i])
       % update the loading time of the corresponding standby server
8.     update_heap_head(min_heap, min.value+ Sorted_Tenant[i])
9.     adjust_heap(min_heap)
10. END FOR
11. total_loading_time <- get_maximum(min_heap)
12. RETURN Replicated Tenant _List
13. RETURN total_loading_time
14. END
```

In other implementations, additional or alternative algorithms may be used. For example, for a relatively small number of machine and small number of users, an enumeration algorithm may be used instead of the greedy algorithm. In a simplified example, for 5 servers and 3 users on each server, all possible backup combinations may be enumerated, and the one with the minimum failover time may be chosen. The number of combinations can be calculated in this way: for the 3 users in the first machine, each of them will choose a machine as backup, so the number of combinations is 81. The same calculation can be used for users in the other 4 machines. Thus, the total number of combinations is 405.

For a large number of severs and a large number of users, e.g., 1000 servers and 50 users on each sever, the total combinations would be $1000*(999^{50})=9.512*E152$, which is a huge number of combinations and is not able to be enumerated in an acceptable time. In this case, the greedy algorithm may be used.

In order to choose between the enumerated algorithm and the greedy algorithm, the equations used to calculate the total number of combinations may be utilized. Specifically, as long as the number of machine and the number of users are given, the total number of combinations can be calculated. If an available computer can enumerate, e.g., one million combinations in several seconds, a threshold may be configured to choose between the enumeration and greedy algorithms, based on an available/allowable time to execute the algorithms.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including comprising:
at least one processor; and
instructions recorded on a non-transitory computer-readable medium, and executable by the at least one processor, the system including
a failover manager configured to cause the at least one processor to determine a plurality of tenants executable on a server of a plurality of servers, each tenant being a virtual machine executable on the server in communication with at least one corresponding user, and each tenant being associated with a loading time representing an amount of time required to load a corresponding replicated tenant for activation and use thereof, the failover manager including
a replicated tenant placement selector configured to dispatch a first replicated tenant for a first tenant of the plurality of tenants and having a first loading time to a first standby server of the plurality of servers, and configured to dispatch a second replicated tenant for a second tenant of the plurality of tenants to a second standby server of the plurality of servers, the second replicated tenant having a second loading time that is less than the first loading time, and
a replicated tenant loader configured to activate, based on a failure of the server, the first replicated tenant on the first standby server to replace the first tenant, and the second replicated tenant on the second standby server to replace the second tenant,
wherein the replicated tenant placement selector is configured to consult a tenant list listing each loading time of each of the plurality of tenants, and sort the plurality of tenants in order of descending loading time to obtain a sorted tenant list, in which the first replicated tenant is listed ahead of the second replicated tenant.

2. The system of claim 1, wherein the failover manager comprises a replication handler configured to create the first replicated tenant and the second replicated tenant, including copying data thereof.

3. The system of claim 1, wherein the failover manager is configured to select the first standby server and the second standby server based on a currently-used capacity thereof.

4. The system of claim 1, wherein the replicated tenant placement selector is configured to dispatch the first replicated tenant and the second replicated tenant including executing a greedy algorithm to identify and select the first standby server and the second standby server, respectively.

5. The system of claim 1, wherein the replicated tenant placement selector is configured to dispatch replicated tenants of the sorted tenants among available standby servers until all available standby servers have received a replicated tenant.

6. The system of claim 5, wherein the replicated tenant placement selector is configured to dispatch replicated tenants of remaining tenants individually, including selecting, during each dispatch, a standby server which results in a minimum total loading time, relative to a total loading time that would have been obtained had the replicated tenant being assigned been assigned to any of the other standby servers, until all remaining replicated tenants have been dispatched.

7. The system of claim 6, wherein the replicated tenant placement selector is configured to update a total loading time for all replicated tenants on each standby server, for each standby server.

8. The system of claim 1, wherein the replicated tenant placement selector is configured to dispatch the first replicated tenant and the second replicated tenant including executing an enumeration algorithm to identify and select the first standby server and the second standby server, respectively.

9. The system of claim 1, wherein the failover manager comprises a fault monitor configured to detect the server failure.

10. The system of claim 1, wherein the failover manager is configured to check remaining server capacity of the plurality of servers after the activation of the first replicated tenant and the second replicated tenant, to determine a need for additional server capacity.

11. The system of claim 1, wherein the replicated tenant placement selector is configured to re-execute a placement selection algorithm for dispatching replicated tenants for remaining tenants of remaining servers, after the activation of the first replicated tenant and the second replicated tenant.

12. A computer-implemented method for executing instructions stored on a non-transitory computer readable storage medium, the method comprising:
determining a plurality of tenants executable on a server of a plurality of servers, each tenant being a virtual machine executable on the server in communication with at least one corresponding user;
consulting a tenant list listing a loading time of each of the plurality of tenants, the loading time representing an amount of time required to load a corresponding replicated tenant for activation and use thereof at a standby server;
sorting the plurality of tenants in order of descending loading time to obtain a sorted tenant list;
dispatching a first replicated tenant for a first tenant of the plurality of tenants to a first standby server of the plurality of servers, based on the sorted tenant list;
dispatching a second replicated tenant for a second tenant of the plurality of tenants to a second standby server of the plurality of servers, based on the sorted tenant list; and
activating, based on a failure of the server, the first replicated tenant on the first standby server to replace the first tenant, and the second replicated tenant on the second standby server to replace the second tenant.

13. The method of claim 12, wherein the dispatching of the first replicated tenant and the second replicated tenant comprises dispatching the first replicated tenant and the second replicated tenant including executing a greedy algorithm to identify and select the first standby server and the second standby server, respectively.

14. A computer program product, the computer program product being tangibly embodied on a non-transitory computer-readable storage medium and comprising instructions that, when executed, are configured to cause at least one processor to:
  determine a plurality of tenants executable on a server of a plurality of servers, each tenant being a virtual machine executable on the server in communication with at least one corresponding user;
  consult a tenant list listing a loading time of each of the plurality of tenants, the loading time representing an amount of time required to load a corresponding replicated tenant for activation and use thereof at a standby server;
  sort the plurality of tenants in order of descending loading time to obtain a sorted tenant list;
  dispatch a first replicated tenant for a first tenant of the plurality of tenants to a first standby server of the plurality of servers;
  dispatch a second replicated tenant for a second tenant of the plurality of tenants to a second standby server of the plurality of servers; and
  activate, based on a failure of the server, the first replicated tenant on the first standby server to replace the first tenant, and the second replicated tenant on the second standby server to replace the second tenant.

15. The computer program product of claim 14, wherein the instructions, when executed, are configured to cause the at least one processor to:
  dispatch the first replicated tenant and the second replicated tenant including executing a greedy algorithm to identify and select the first standby server and the second standby server, respectively.

16. The computer program product of claim 14, wherein the instructions, when executed, are configured to cause the at least one processor to:
  dispatch replicated tenants of the sorted tenants among available standby servers until all available standby servers have received a replicated tenant.

17. The computer program product of claim 16, wherein the instructions, when executed, are configured to cause the at least one processor to:
  dispatch replicated tenants of remaining tenants individually, including selecting, during each dispatch, a standby server which results in a minimum total loading time, relative to a total loading time that would have been obtained had the replicated tenant being assigned been assigned to any of the other standby servers, until all remaining replicated tenants have been dispatched.

18. The computer program product of claim 14, wherein the instructions, when executed, are configured to cause the at least one processor to:
  re-execute a placement selection algorithm for dispatching replicated tenants for remaining tenants of remaining servers, after the activation of the first replicated tenant and the second replicated tenant.

* * * * *